April 12, 1927.
A. MARTIN
MEANS FOR ORNAMENTING FOODSTUFFS
Filed March 30, 1926
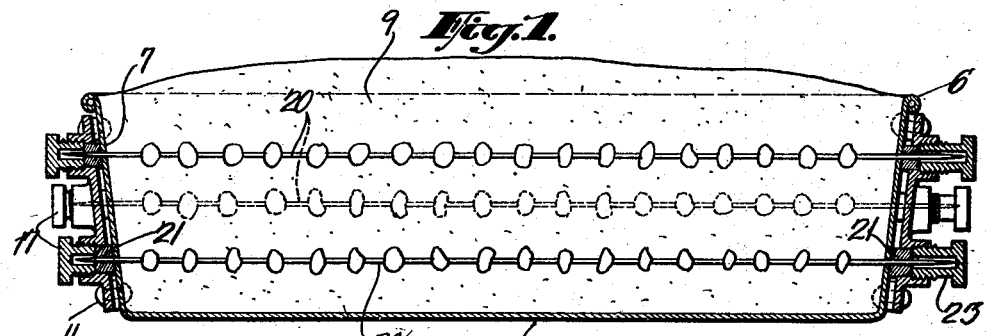
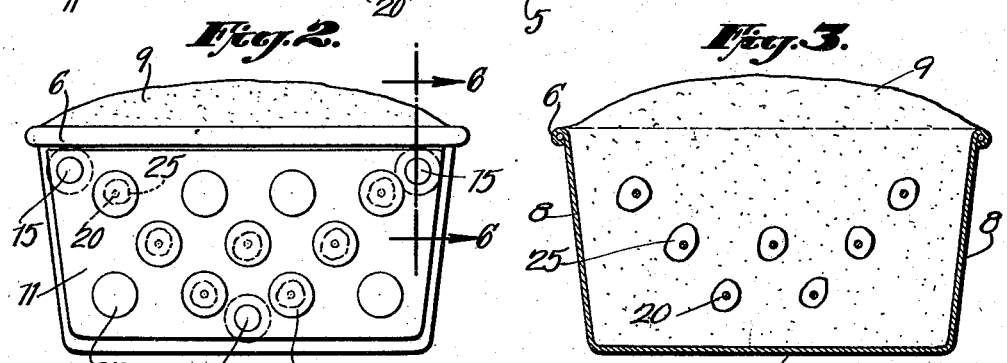
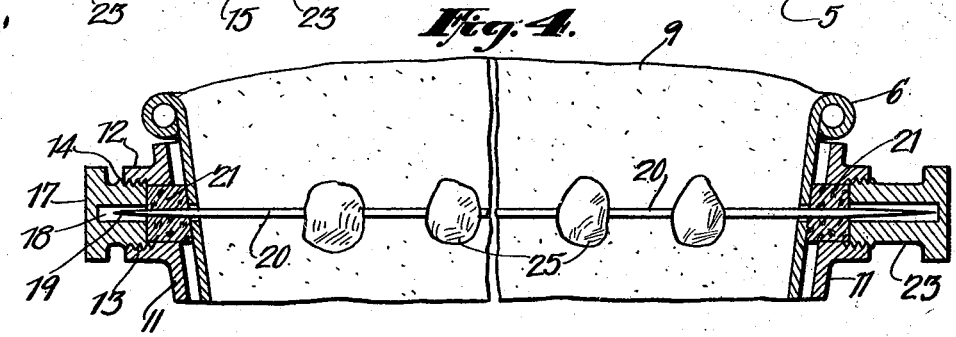
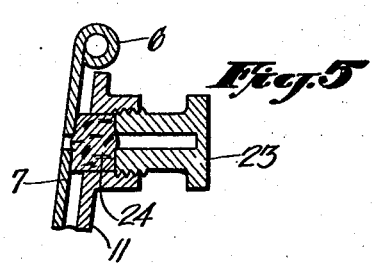
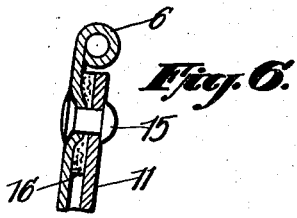
INVENTOR.
ALBERT MARTIN
BY
ATTORNEY.

Patented Apr. 12, 1927.

1,624,670

UNITED STATES PATENT OFFICE.

ALBERT MARTIN, OF NEW YORK, N. Y.

MEANS FOR ORNAMENTING FOODSTUFFS.

Application filed March 30, 1926. Serial No. 98,592.

This invention relates to a method for ornamenting foodstuffs and to the means for carrying out such ornamentation.

A particular object of the invention is to provide a method whereby foodstuffs, such as, cakes, ice cream, jellies and the like, can be ornamented so that when cut in slices any particular design desired may show in the sliced piece which will enhance the appearance thereof.

A further object of the invention is to provide means for carrying out this ornamentation by providing in a container, in which cake or jellies or ice cream are formed to a particular shape, a means for carrying the ornamental features whereby the same will be aligned in proper position to provide in the sliced foodstuffs any desired ornamentation.

A further particular object of the invention is to provide a means for the placing of a design, such for instance, as the picture of a person or any fanciful design in the body of a jelly, cake or like foodstuffs.

To enable others skilled in the art to fully comprehend the underlying features of my invention that they may embody the same in the various modifications in structure and relation contemplated, drawings depicting a preferred form have been annexed as a part of this disclosure and in such drawings similar reference characters denote corresponding parts throughout all the views, of which, Figure 1 is a sectional view in elevation the section being taken longitudinally of a container or pan in which is disposed a foodstuff, such as cake, the ornamentation thereof being carried out by the arrangement shown.

Figure 2 is an end view of the pan, the face plate thereof being shown and in connection therewith the ornamenting means.

Figure 3 is a cross section taken through the pan in which is carried a foodstuff, such as cake, the same being shown in cross section to illustrate the placing of raisins or other ornamenting members in a peculiar design.

Figure 4 is an enlarged fragmentary view of the opposite ends of the pan member showing the method of holding an ornament carrying rods therein.

Figure 5 is an enlarged view through a section of the pan and rod carrying members when not in use, and Figure 6 is a cross section taken on the line 6—6 of Figure 2 and shows the method of connecting the end plate to the pan or container.

Referring to the drawings in detail wherein I have illustrated a particular type of pan member and for the purposes of illustration only have shown therein cake or other like foodstuff, it being understood that I do not wish to be limited to the precise showing of the drawing but rather wish it understood that my present invention can be used for ornamenting any kind of foodstuff, such as, cake, ice cream, jellies or the like, and as illustrated in Figure 1, 5 indicates a pan or container, the upper edge of which is reinforced as at 6 in the usual manner, the pan comprising the usual end 7 and sides 8, within which is held any particular foodstuff, such for instance, as cake 9. As shown in Figure 3, I have provided the cake with a particular ornamental design and in order to accomplish this, I make use of a plurality of rod or pin members 20, which extend longitudinally of the pan and pass through the opposite ends 7 thereof, said opposite ends 7 being provided with any number of openings through which the pins are adapted to be passed, and as illustrated in Figure 1, it will be noted that the left-hand end of the pan is provided with a spaced retaining plate 11, in which is provided the protruding bosses 12, which are provided with a central bore 13 in which are formed the interior thread 14. The plate 11 is secured in spaced relation with the end of the pan through the medium of suitable rivets 15, disposed at the corners thereof which bind the end of the pan and the plate 11 together, the same being held in slightly spaced relation through the medium of an interposed washer 16 adjacent each rivet. The space between the plate 11 and the end of the pan is provided for air circulation so that when the pan is placed in an oven, the heat will be equalized on all side surfaces of the pan and will thereby bake the contents of the pan evenly on the ends and on the sides. As is shown in Figure 2, I have provided a number of bosses 12 and while I have shown one particular arrangement thereof, it is to be distinctly understood that any particular arrangement and design may be carried out in the spacing and location of these bosses. The bosses 12 in their threaded portions receive the plug members 17 which are also threaded and are provided with a central bore 18 in which is disposed the pointed end 19 of the longitudinally extending rod or pin member 20. Surrounding the end of the pin 20 and lying within the bore 13 of the boss 12 is disposed a cork washer or insert 21, the purpose of which is to seal the openings in the pan through which the pin members 20 extend, thereby preventing the contents held in the pan from oozing or expanding through said openings. The plug members 17 when threaded into the bosses 12 will, of course, compress the cork inserts 21 and forcing them against the end of the pan adjacent the pin openings will render said pin openings liquid proof. The right-hand end of the pan is provided with a similar plate and it is not believed that detailed description thereof is necessary, it being sufficient to say that the plug members 23, at this end of the pan, are longer than the plug members 17 so that they will accommodate the projecting ends of the pins 20, it being of course understood that one end of the pins must necessarily protrude further beyond the bosses than the opposite end so that when the plug members 23 are removed, the pins can be drawn out at one end of the pan.

In some of the bosses, as there will be no pins during the baking process or the coagulation of a jelly or freezing of the ice cream, whichever is the case, it will be necessary to provide some means for entirely closing up the pin openings in the ends of the pan, and for this purpose I provide the solid cork inserts or plugs 24 which are forced against the ends 7 of the pan by threading in the plugs 17 or 23, depending upon which end of the pan is being referred to.

Upon inspection of Figure 2, it will be noted that I have shown the pins 21 in substantially W-shape, and if in the case of baking a cake, this particular design is desired, raisins for instance or other suitable fruit or in fact any pictures or any other ornamentation desired and indicated as at 25, is placed upon the rods 21 and when the rods are positioned in the pan and locked in place at both ends through the medium of the plugs 17 and 23, the raisins for instance will have the appearance in longitudinal section, as illustrated in Figure 1, and in cross section will appear as in Figure 3. It is evident therefore that when the ornamental members have been positioned to suit the taste of the individual that the foodstuff can be poured into the pan preparatory to baking or freezing and the ornamental members will be embedded therein.

When the freezing or baking has been completed it is then simply necessary to remove the plug members 23 which cover the protruding end of the pins and to grip the the ends of the pins in the fingers and draw the same longitudinally from one end of the pan, so that the raisins or other ornamental features 25 will be left securely embedded in the foodstuff and when the same is cut the cake or other foodstuff will have the appearance as shown in Figure 3 and each slice of the foodstuff will carry the ornamentation.

It will, of course, be understood that instead of using raisins a solid longitudinally extending ornamentation of any cross section can be used and any number may be used, and while I have only shown seven in the design in Figure 3, it is to be distinctly understood that any number may be used which can be accommodated in the pan.

It is evident that when the ornamentations 25 have been disposed in suitable space relation along the rods 20, the ends of the latter will be passed through the openings in one end of the pan and then the opposite ends will be passed through the openings in the opposite ends of the pan, and when the plugs have been threaded into their position, the pins will be securely held and the pan may be transported from place to place or handled in the usual manner without displacing the ornaments 25 carried on said rods or pins 20.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:

1. A means for ornamenting foodstuffs comprising a container, rods extending between the walls thereof and adapted to carry ornamenting members and said walls being provided with openings through which the rods may be removed whereby the ornamenting members are left embedded in the body of the foodstuff.

2. A means for ornamenting foodstuffs comprising a container having openings in the walls thereof, rods extending across said container and passing through said openings, said rods being adapted to carry edible members disposed in ornamental arrangement, and means whereby the rods may be drawn out of said container when the foodstuff is in edible condition so that the members carried by the rod will remain in position in the foodstuff to form a design when the same is cut in slices.

3. A means for ornamenting foodstuffs which comprises a container in which the same is prepared, the opposite walls of the container being provided with openings, rods passing through said openings, and adapted to carry edible members arranged in design formation, plates attached to said walls, rod holding members in said plates, said members being removable whereby the rods can be drawn out of the container to leave the edible pieces embedded in the foodstuff.

4. A means for ornamenting foodstuffs comprising a container the opposite walls of which are provided with a plurality of openings, rods extending between the walls passing through said openings and adapted to carry edible members, plates carried by the walls in spaced relation therewith, plug receiving extensions on said plates, said extensions coinciding with said openings, closure members in said extension, and plug members for said extensions arranged to cover the ends of said rods and force said closure members into position to seal the openings in said container walls.

5. A means for ornamenting foodstuffs comprising a container, rods extending between the walls thereof and adapted to carry ornamenting members, the said walls being provided with openings through which the rods may be removed whereby the ornamenting members are left imbedded in the body of the foodstuff, and means for locking said rods in position within the container.

6. A means for ornamenting foodstuffs comprising a container, rods extending between the walls thereof and adapted to carry ornamenting members and said walls being provided with openings through which the rods may be removed whereby the ornamenting members are left imbedded in the body of the foodstuff, means for closing the openings in the container at a point where the rods pass therethrough and means for locking the rods in position in said container.

7. A means for ornamenting foodstuffs comprising a container, a plurality of holders extending between the walls of said container for retaining edible pieces in design formation in the body of a foodstuff held in the container, means for locking the holders in position in said container and said locking member being arranged to allow withdrawal of said holders from said container.

In testimony whereof I affix my signature.

ALBERT MARTIN. [L. S.]